(12) United States Patent
Huang

(10) Patent No.: US 11,762,475 B2
(45) Date of Patent: Sep. 19, 2023

(54) AR SCENARIO-BASED GESTURE INTERACTION METHOD, STORAGE MEDIUM, AND COMMUNICATION TERMINAL

(71) Applicant: GUANGDONG OPPO MOBILE TELECOMMUNICATIONS CORP., LTD., Guangdong (CN)

(72) Inventor: Fenghua Huang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 36 days.

(21) Appl. No.: 17/524,721

(22) Filed: Nov. 11, 2021

(65) Prior Publication Data

US 2022/0075453 A1 Mar. 10, 2022

Related U.S. Application Data

(63) Continuation of application No. PCT/CN2020/089449, filed on May 9, 2020.

(30) Foreign Application Priority Data

May 13, 2019 (CN) .......................... 201910395297.9

(51) Int. Cl.
*G06F 3/01* (2006.01)
*G06T 7/73* (2017.01)
(Continued)

(52) U.S. Cl.
CPC .............. *G06F 3/017* (2013.01); *G06T 5/006* (2013.01); *G06T 7/50* (2017.01); *G06T 7/74* (2017.01);
(Continued)

(58) Field of Classification Search
CPC ........ G06F 3/017; G06F 3/011; G06F 3/0304; G06T 5/006; G06T 7/50; G06T 7/74;
(Continued)

(56) References Cited

U.S. PATENT DOCUMENTS 9,122,053 B2 * 9/2015 Geisner ................... G06F 3/011
9,536,136 B2 * 1/2017 Kounavis .................. G06T 7/70
(Continued)

FOREIGN PATENT DOCUMENTS

CN 102129708 7/2011
CN 105528082 4/2016
(Continued)

OTHER PUBLICATIONS

CNIPA, First Office Action for CN Application No. 201910395297. 9, dated Jan. 25, 2021.
(Continued)

*Primary Examiner* — Motilewa Good-Johnson
(74) *Attorney, Agent, or Firm* — Hodgson Russ LLP

(57) ABSTRACT

An AR scenario-based gesture interaction method, a non-transitory computer-readable medium, and a wireless communication terminal. The method includes: collecting a RGB image, a depth image, and corresponding IMU data of a current frame; obtaining posture information and hand information of the current frame by processing the RGB image, the depth image, and the IMU data; obtaining three-dimensional point cloud information of a hand in a reference coordinate system by performing three-dimensional dense modeling based on the posture information and the hand information of the current frame; obtaining pose information of a virtual object in the reference coordinate system; and obtaining an occlusion relationship between the hand and the virtual object by rendering the hand and the virtual object based on the three-dimensional point cloud information of (Continued)

the hand, the pose information of the virtual object, and preset point cloud information of the virtual object in the reference coordinate system.

19 Claims, 4 Drawing Sheets

(51) Int. Cl.
| | | |
|---|---|---|
| *G06T 7/50* | (2017.01) | |
| *G06V 10/44* | (2022.01) | |
| *G06V 10/28* | (2022.01) | |
| *G06V 40/10* | (2022.01) | |
| *G06T 5/00* | (2006.01) | |
| *G06T 19/00* | (2011.01) | |

(52) U.S. Cl.
CPC ............ *G06T 19/006* (2013.01); *G06V 10/28* (2022.01); *G06V 10/44* (2022.01); *G06V 40/107* (2022.01); *G06T 2207/10024* (2013.01); *G06T 2207/10028* (2013.01); *G06T 2207/10048* (2013.01); *G06T 2207/20028* (2013.01); *G06T 2207/20032* (2013.01); *G06T 2207/30196* (2013.01)

(58) Field of Classification Search
CPC ......... G06T 19/006; G06T 2207/10024; G06T 2207/10028; G06T 2207/10048; G06T 2207/20028; G06T 2207/20032; G06T 2207/30196; G06T 7/73; G06V 10/28; G06V 10/44; G06V 40/107; G06V 20/20; G06V 20/647; G06V 40/28
See application file for complete search history.

(56) References Cited

U.S. PATENT DOCUMENTS

| | | | | |
|---|---|---|---|---|
| 10,168,768 | B1* | 1/2019 | Kinstner | G06F 3/04847 |
| 10,572,072 | B2* | 2/2020 | Wang | G06F 3/0416 |
| 10,614,591 | B2* | 4/2020 | Taylor | G06T 7/194 |
| 10,909,762 | B2* | 2/2021 | Karalis | G06T 11/60 |
| 11,073,898 | B2* | 7/2021 | Wang | G06T 1/0007 |
| 11,170,578 | B1* | 11/2021 | Casaburo | G06T 7/277 |
| 2008/0284864 | A1* | 11/2008 | Kotake | G06V 10/245 |
| | | | | 348/222.1 |
| 2012/0206452 | A1* | 8/2012 | Geisner | G06V 20/653 |
| | | | | 345/419 |
| 2013/0215230 | A1* | 8/2013 | Miesnieks | G06T 19/006 |
| | | | | 348/46 |
| 2014/0104274 | A1* | 4/2014 | Hilliges | G06F 3/017 |
| | | | | 345/424 |
| 2014/0184644 | A1* | 7/2014 | Sharma | G06T 19/006 |
| | | | | 345/633 |
| 2016/0180595 | A1* | 6/2016 | Grossinger | G06F 3/017 |
| | | | | 345/419 |
| 2016/0239080 | A1* | 8/2016 | Marcolina | G06F 1/163 |
| 2016/0314622 | A1* | 10/2016 | Davis | G06F 3/011 |
| 2016/0364912 | A1* | 12/2016 | Cho | G06F 3/0304 |
| 2017/0140552 | A1* | 5/2017 | Woo | G06F 3/0304 |
| 2019/0066306 | A1* | 2/2019 | Masuda | G06V 10/46 |
| 2019/0258058 | A1* | 8/2019 | Fortin-Deschênes | |
| | | | | G06T 19/006 |
| 2019/0258318 | A1* | 8/2019 | Qin | G06F 3/01 |
| 2019/0371072 | A1* | 12/2019 | Lindberg | G06T 19/006 |
| 2020/0066047 | A1* | 2/2020 | Karalis | G06T 19/006 |
| 2020/0098175 | A1* | 3/2020 | Chen | G06T 19/00 |
| 2020/0182623 | A1* | 6/2020 | Huang | G05D 1/0094 |
| 2020/0342674 | A1* | 10/2020 | Chen | G06T 7/55 |
| 2021/0004979 | A1* | 1/2021 | Valentin | G06T 19/006 |
| 2021/0019930 | A1* | 1/2021 | Greco | G06F 3/0346 |
| 2021/0063735 | A1* | 3/2021 | Cai | G06T 15/00 |
| 2021/0319576 | A1* | 10/2021 | Huang | G06V 10/764 |
| 2021/0327101 | A1* | 10/2021 | Ikeda | H04N 9/3185 |
| 2022/0075453 | A1* | 3/2022 | Huang | G06T 7/50 |

FOREIGN PATENT DOCUMENTS

| | | |
|---|---|---|
| CN | 106056664 | 10/2016 |
| CN | 106875482 | 6/2017 |
| CN | 107430437 | 12/2017 |
| CN | 107869989 | 4/2018 |
| CN | 108986223 | 12/2018 |
| CN | 109471521 | 3/2019 |
| CN | 110221690 | 9/2019 |
| JP | 2018200519 | 12/2018 |

OTHER PUBLICATIONS

CNIPA, Second Office Action for CN Application No. 201910395297.9, dated Jul. 21, 2021.
WIPO, International Search Report for PCT/CN2020/089449, dated Aug. 11, 2020.
EPO, Extended European Search Report for EP Application No. 20806092.1, dated Jun. 29, 2022.
Williem et al., "Visual-Inertial RGB-D SLAM for Mobile Augmented Reality," Advances in Biometrics: International Conference, ICB, 2007.

* cited by examiner

AR SCENARIO-BASED GESTURE INTERACTION METHOD, STORAGE MEDIUM, AND COMMUNICATION TERMINAL

CROSS REFERENCE

The present application is a continuation of International Patent Application No. PCT/CN2020/089449, filed May 9, 2020, which claims priority to Chinese Patent Application No. 201910395297.9, filed May 13, 2019, the entire disclosures of which are incorporated herein by reference.

TECHNICAL FIELD

The present disclosure relates to the field of augmented reality technologies, and in particular to an AR scenario-based gesture interaction method, a storage medium, and a communication terminal.

BACKGROUND

Augmented reality (AR) is a method of applying virtual information to the real world through information technology and superimposing the real environment and virtual objects on the same screen or space in real time. With the rapid development of smart mobile terminals, interaction with AR gestures can be implemented on terminal devices. In a related solution, based on a gesture recognition result of a two-dimensional (2D) image, simple interaction with virtual objects in the AR scene can be realized through a 2D simultaneous localization and mapping (SLAM) model. In another solution, based on a gesture recognition result of a three-dimensional (3D) image, the interaction with the virtual objects in the AR scene can be realized through the 2D SLAM model.

It should be noted that the information disclosed in the background art section above is only to enhance the understanding of the background of the present disclosure, and therefore may include information that does not constitute the prior art known to those skilled in the art.

SUMMARY OF THE DISCLOSURE

The purpose of the present disclosure is to provide an AR scenario-based gesture interaction method, a non-transitory computer-readable medium, and a wireless communication terminal.

Other features and advantages of the present disclosure will become apparent through the following detailed description, or will be learned in part through the practice of the present disclosure.

In a first aspect, the present disclosure provides an augmented reality scenario-based gesture interaction method, including: collecting a red-green-blue (RGB) image, a depth image, and corresponding inertial measurement unit (IMU) data of a current frame; obtaining posture information and hand information of the current frame by processing the RGB image, the depth image, and the IMU data; obtaining three-dimensional point cloud information of a hand in a reference coordinate system by performing three-dimensional dense modeling based on the posture information and the hand information of the current frame; obtaining pose information of a virtual object in the reference coordinate system; and obtaining an occlusion relationship between the hand and the virtual object by rendering the hand and the virtual object based on the three-dimensional point cloud information of the hand, the pose information of the virtual object, and preset point cloud information of the virtual object in the reference coordinate system.

In a second aspect, the present disclosure provides a non-transitory computer-readable storage medium, storing a computer program; wherein the computer program is executed by a processor to perform the above augmented reality scenario-based gesture interaction method.

In a third aspect, the present disclosure provides a wireless communication terminal, including: one or more processors; and a storage device, configured to store one or more programs, when the one or more programs are executed by the one or more processors, the one or more processors perform the above augmented reality scenario-based gesture interaction method.

It should be understood that the above general description and the later detailed descriptions are exemplary and explanatory only and do not limit the present disclosure.

BRIEF DESCRIPTION OF THE DRAWINGS

The drawings herein are incorporated into the specification and constitute a part of the specification, show embodiments that conform to the present disclosure, and together with the specification are to explain the principle of the present disclosure. Obviously, the drawings in the following description are only some embodiments of the present disclosure. For those skilled in the art, other drawings can be obtained from these drawings without creative work.

DETAILED DESCRIPTION

Figure 1:
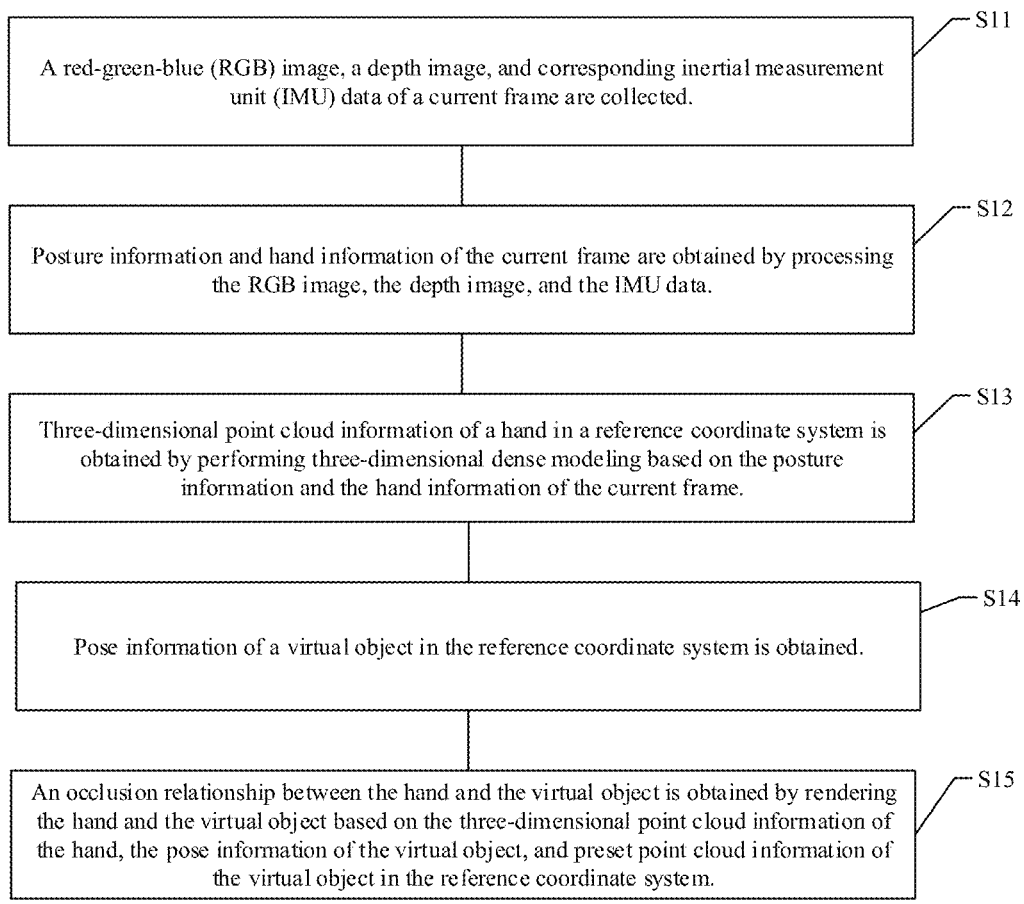
FIG. 1 is a flowchart of an AR scenario-based gesture interaction method according to an embodiment of the present disclosure.

Embodiments will be described more fully with reference to the accompanying drawings. However, the embodiments can be implemented in various forms, and should not be construed as being limited to the examples set forth herein; on the contrary, the provision of these embodiments makes the present disclosure more comprehensive and complete, and fully conveys the concept of the embodiments to those skilled in the art. The described features, structures or characteristics can be combined in one or more embodiments in any suitable way.

In addition, the drawings are only schematic illustrations of the present disclosure, and are not necessarily drawn to scale. Same reference numerals in the figures denote same or similar parts, and thus their repeated description will be omitted. Some of the block diagrams shown in the drawings are functional entities and do not necessarily correspond to physically or logically independent entities. These functional entities may be implemented in the form of software, or implemented in one or more hardware modules or integrated circuits, or implemented in different networks and/or processor devices and/or microcontroller devices.

Augmented reality (AR) is a method of applying virtual information to the real world through information technology and superimposing the real environment and virtual objects on the same screen or space in real time. With the rapid development of smart mobile terminals, interaction with AR gestures can be implemented on terminal devices. In a related solution, based on a gesture recognition result of a two-dimensional (2D) image, simple interaction with virtual objects in the AR scene can be realized through a 2D simultaneous localization and mapping (SLAM) model. In another solution, based on a gesture recognition result of a three-dimensional (3D) image, the interaction with the virtual objects in the AR scene can be realized through the 2D SLAM model.

Among the above-mentioned related solutions, the AR gesture interaction solution based on the mobile phone platform still has some problems and deficiencies in the process of gestures interacting with the virtual objects. For example, the related solutions mostly drive actions or behaviors of the virtual objects based on the results of gesture recognition, but an occlusion relationship between the hands and the virtual objects in the AR scene cannot be realized, and the "contact" with the virtual objects cannot be realized, which may cause that the user's interactive experience with virtual objects in the AR scene is not realistic enough. For another example, the application of a gesture recognition algorithm based on 2D images combined with the 2D SLAM algorithm, or the application of a gesture recognition algorithm based on 3D images combined with the 2D SLAM algorithm, is to drive some actions or behaviors of the virtual objects in the AR scene based on the results of gesture recognition, while being unable to accurately realize and display the occlusion relationship between the hands and the virtual objects in the AR scene.

In view of the shortcomings and deficiencies of the above related solutions, the embodiments provide an AR scenario-based gesture interaction method, which can be applied to terminal devices equipped with rear cameras, such as a mobile phone, a tablet, and a smart television with a camera, a personal computer, etc.; or, can also be applied to AR glasses or AR helmets equipped with cameras. Referring to FIG. 1, the AR scenario-based gesture interaction method may include the following operations.

At block S11: A red-green-blue (RGB) image, a depth image, and corresponding inertial measurement unit (IMU) data of a current frame are collected.

At block S12: Posture information and hand information of the current frame are obtained by processing the RGB image, the depth image, and the IMU data.

At block S13: Three-dimensional point cloud information of a hand in a reference coordinate system is obtained by performing three-dimensional dense modeling based on the posture information and the hand information of the current frame.

At block S14: Pose information of a virtual object in the reference coordinate system is obtained.

At block S15: An occlusion relationship between the hand and the virtual object is obtained by rendering the hand and the virtual object based on the three-dimensional point cloud information of the hand, the pose information of the virtual object, and preset point cloud information of the virtual object in the reference coordinate system.

In the AR scenario-based gesture interaction method provided by the embodiment, the RGB image and the depth image of the current frame are obtained at the same time. After obtaining the information of the hand in the current frame, a hand area is 3D dense modeled to obtain the 3D point cloud information of the hand area in the AR scene, and rendering is performed based on the 3D point cloud information and the pose information of the hand area to obtain the occlusion relationship between the hand area and the virtual object, such that the hand and the virtual object can have more accurate contact effects and relative position display effects in the AR scene, and more interactive actions can thus be performed between the hand and the virtual object.

In the following, a mobile phone is taken as an example, and each operations of the AR scenario-based gesture interaction method will be described in more detail in conjunction with the accompanying drawings and embodiments.

For the above terminal device, two cameras may be configured on a same side of the terminal device, for example, on the back of the terminal device to collect images on the same side. One camera may be a plane camera configured to collect RGB images, and the other camera may be a depth camera configured to collect depth images, such as a ToF camera module. In addition, the two cameras may be cameras or camera modules embedded in the terminal device, and may also be lifting or external camera modules, which are not specifically limited in the present disclosure.

At block S11: A red-green-blue (RGB) image, a depth image, and corresponding inertial measurement unit (IMU) data of a current frame are collected.

The planar imaging camera of the terminal device may be arranged to collect the RGB image of the current frame including the hand in real time, and the ToF camera module may be arranged to collect the depth image of the current frame including the hand. Moreover, the IMU data of the terminal device at the corresponding time of each frame of image can also be collected, such as gyroscope information and accelerometer information.

At block S12: Posture information and hand information of the current frame are obtained by processing the RGB image, the depth image, and the IMU data.

After obtaining the above parameters, the hand information and the corresponding posture information in the current frame image can be recognized and extracted. In some embodiments, a preset SLAM model can be input based on the RGB image and IMU data as input parameters to obtain the posture information of the current frame; and the RGB image and the depth image can be recognized to obtain the hand information; wherein the hand information may include: hand contour information and hand depth information.

Figure 2:
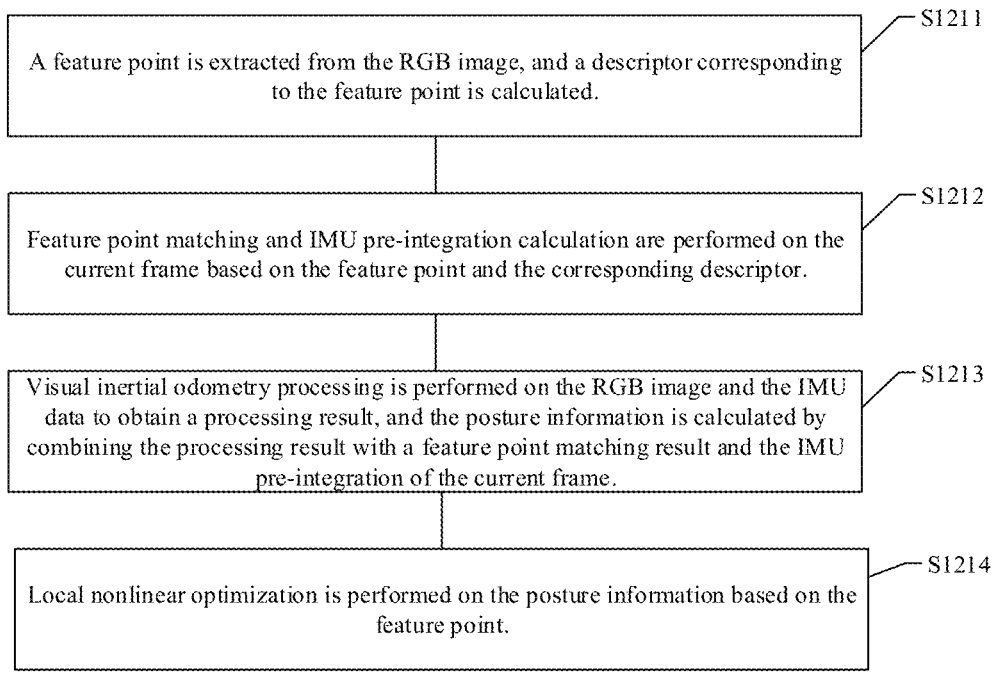
FIG. 2 is a flowchart of an operation S12 shown in FIG. 1 according to an embodiment of the present disclosure.

In some embodiments, referring to FIG. 2, the obtaining the pose information of the current frame by inputting the preset SLAM model based on the RGB image and IMU data as input parameters may include operations as followed.

At block S1211: A feature point is extracted from the RGB image, and a descriptor corresponding to the feature point is calculated.

At block S1212: Feature point matching and IMU pre-integration calculation are performed on the current frame based on the feature point and the corresponding descriptor.

At block S1213: Visual inertial odometry processing is performed on the RGB image and the IMU data to obtain a processing result, and the posture information is calculated by combining the processing result with a feature point matching result and the IMU pre-integration of the current frame.

A Difference of Gaussian (DoG, corner detection) method may be applied for the feature point extraction of the RGB image. And each feature point may be described through the corresponding descriptor. After obtaining the feature points and corresponding descriptors of consecutive multiple frames of images, the feature point matching of the current frame image can be performed, and the IMU pre-integration calculation can be performed. Moreover, a visual inertial odometry (VIO) process may be performed based on the RGB image and corresponding IMU data of the current frame to estimate its position and rotation changes. Then the feature point matching result and IMU pre-integration are further combined to calculate the posture information of the camera module for each frame.

In addition, in some embodiments, the method may further include operations as followed.

At block S1214: Local nonlinear optimization is performed on the posture information based on the feature point.

After obtaining the posture information of each frame, it is also possible to perform local linear optimization in combination with the feature point information of the image, so as to optimize the posture information of each frame. For example, through the existing g2o optimization library or ceres optimization library, the pose information of the current frame can be combined with the map point information corresponding to the feature point to construct a cost function, and the posture information of the current frame can be optimized through the cost function.

Of course, in other embodiments, it is also possible to combine the posture information of each frame and select a key frame for map reconstruction to optimize the posture information of the key frame in the form of a partial window; and to perform closed-loop detection on all key frames to optimize accumulate errors to further optimize the posture information.

Figure 3:
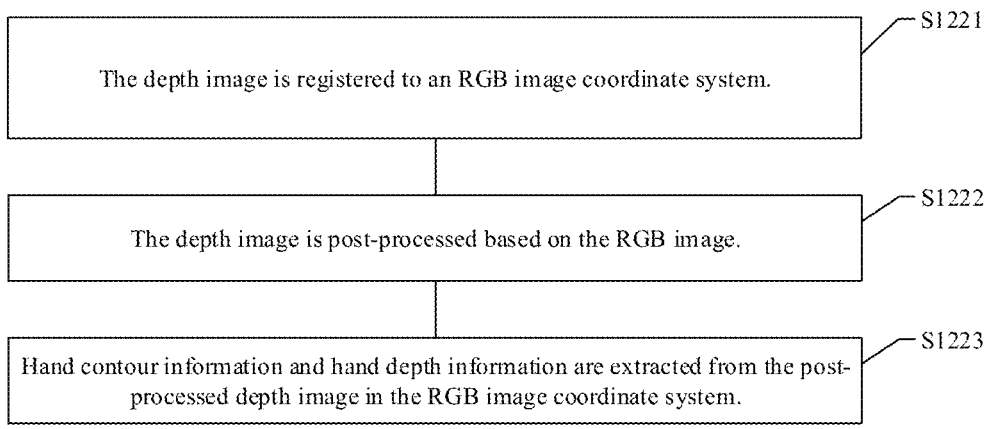
FIG. 3 is a flowchart of an operation S12 shown in FIG. 1 according to another embodiment of the present disclosure.

In addition, in some embodiments, referring to FIG. 3, the above recognizing the RGB image and the depth image to obtain hand information may further include operations as followed.

At block S1221: The depth image is registered to an RGB image coordinate system.

At block S1222: The depth image is post-processed based on the RGB image.

At block S1223: Hand contour information and hand depth information are extracted from the post-processed depth image in the RGB image coordinate system.

When registering the depth image, for example, the depth image may be first subjected to distortion removal processing according to internal parameters of the depth image; coordinate points of the depth image are traversed in a loop, and a three-dimensional coordinate X3d_tof of a corresponding coordinate point in the depth camera coordinate system is obtained by combining a depth value of the corresponding coordinate point; then based on the external parameters of the depth image, the external parameters of the RGB image, and the internal parameters of the RGB image, the three-dimensional coordinate is projected to the RGB image coordinate system to obtain a coordinate of the corresponding coordinate point in the RGB image coordinate system. In some embodiments, the coordinate conversion can be performed according to the following formula.

$$X2d\_rgb = K\_rgb * X3d\_rgb = K\_rgb * [R\_tof2rgb | t\_tof2rgb] * X3d\_tof$$

wherein X2d_rgb is the coordinate of a coordinate point in the RGB image coordinate system; X3d_tof is the three-dimensional coordinate of the coordinate point in a depth camera coordinate system; K_rgb is an internal parameter matrix of the RGB Camera; R_tof2rgb is a rotation between the RGB Camera and the TOF module (from a TOF coordinate system to the RGB image coordinate system); t_tof2rgb is a translation amount between RGB Camera and TOF module (i.e., representing of an origin of TOF module coordinate system in the RGB Camera coordinate system).

The coordinate of the corresponding coordinate point in the RGB image coordinate system may be de-distorted to obtain the corresponding X2d_rgb' coordinate, and the corresponding depth value takes the z-axis coordinate of X3d_rgb to obtain a depth map registered in the RGB image coordinate system.

After the depth image is registered to the RGB image coordinate system, the depth image can also be post-processed, for example, operations such as noise removal, bilateral filtering, or hole filling can be performed. Then, the hand contour information can be extracted from the post-processed depth image. In some embodiments, binarization processing may be performed according to an infrared (IR) image corresponding to the depth image, and then the binarized hand contour information may be extracted.

In other embodiments, before the depth image is registered to the RGB image coordinate system, the depth image may be preprocessed; wherein, the preprocessing includes: any one of median filtering, bilateral filtering, and hole filling.

The internal parameters of the depth image and of the RGB image may include: the position of an optical center of a camera perpendicular to an image plane (i.e., pixel coordinates, which can be expressed by cx, cy); a focal length of the camera (respectively expressed by fx, fy), a radial distortion (represented by p1, p2, p3, etc.) and a tangential distortion coefficient (represented by k1, k2) of the camera. The external parameters between the depth image and the RGB image may include: the translation and rotation relationship between a three-dimensional coordinate system of the camera with an optical center of the depth image as the coordinate origin and a three-dimensional coordinate system of the camera with an optical center of the RGB image as the coordinate origin.

At block S13: Three-dimensional point cloud information of a hand in a reference coordinate system is obtained by performing three-dimensional dense modeling based on the posture information and the hand information of the current frame.

Figure 4:
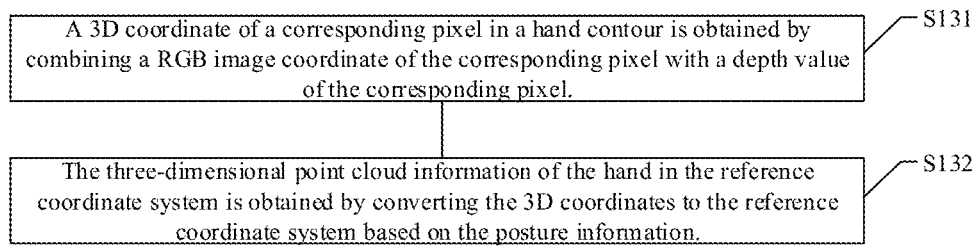
FIG. 4 is a flowchart of an operation S13 shown in FIG. 1 according to an embodiment of the present disclosure.
Figure 5:
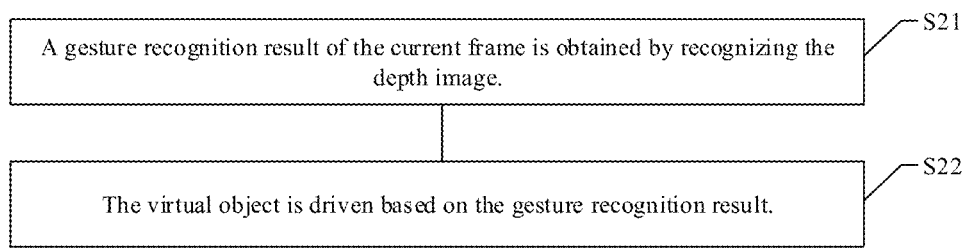
FIG. 5 is a flowchart of further operations of the method shown in FIG. 1 according to an embodiment of the present disclosure.

Referring to FIG. 4, an embodiment of the operation S13 may include operations as followed.

At block S131: A 3D coordinate of a corresponding pixel in a hand contour is obtained by combining a RGB image coordinate of the corresponding pixel with a depth value of the corresponding pixel.

At block S132: The three-dimensional point cloud information of the hand in the reference coordinate system is obtained by converting the 3D coordinates to the reference coordinate system based on the posture information.

Through the extraction of the hand area, the hand contour information is obtained. The 2D image coordinates (RGB image coordinates) of all pixels in the hand contour area are combined with the corresponding depth values to obtain the corresponding 3D coordinates, and further combining the posture information of the current frame (6DOF posture information) to convert the 3D coordinates to the SLAM reference coordinate system to obtain the corresponding dense point cloud information, thereby completing the dense 3D reconstruction process of the hand area.

At block S14: Pose information of a virtual object in the reference coordinate system is obtained.

A hit test on the virtual object may be triggered based on a control instruction triggered on the terminal device by a user, so as to obtain the posture information of the virtual object (i.e., an anchor) in the SLAM reference coordinate system. Through a collision detection algorithm, the position and orientation of the virtual object in the SLAM reference coordinate system can be obtained.

In other embodiments, the above operations S13 and S14 may also be performed at the same time, such that the pose information of the virtual object and the three-dimensional point cloud information of the hand in the reference coordinate system can be obtained at the same time. Alternatively, the hit test on the virtual object can also be triggered when the image and IMU data are collected. The present disclosure does not specifically limit the execution order of S13.

At block S15: An occlusion relationship between the hand and the virtual object is obtained by rendering the hand and the virtual object based on the three-dimensional point cloud information of the hand, the pose information of the virtual object, and preset point cloud information of the virtual object in the reference coordinate system.

The three-dimensional point cloud information of the hand and the preset point cloud of the virtual object may be gridded to obtain a hand grid and a virtual object grid, and the hand grid and the virtual object grid may be rendered according to the pose information of the virtual object in the reference coordinate system.

In some embodiments, the three-dimensional point cloud of the hand area can be converted to the SLAM reference coordinate system through the posture information corresponding to the current frame. After obtaining the posture information of the virtual object in the SLAM reference coordinate system through the hit test, perspectives of the virtual camera and the real camera can also be aligned in a Unity rendering engine, and the virtual object can be converted to the SLAM reference coordinate system after aligning the perspective. After obtaining the grid information of the hand area, the Unity rendering engine can be configured to combine the grid information of the hand area and the pose information of the virtual object for rendering to obtain the occlusion effect and positional relationship between the hand and the virtual object.

Based on the foregoing, in other embodiments, the method may further include operations as followed.

At block S21: A gesture recognition result of the current frame is obtained by recognizing the depth image.

At block S22: The virtual object is driven based on the gesture recognition result.

After obtaining the depth image, while extracting the hand area, the gesture of the current frame can also be recognized through the depth image. For example, hand calibration data (at hand skeleton point position) of the TOF depth image can be configured as a training sample to train a deep learning model. Therefore, the trained model is applied combining with a circumscribed rectangular area of the hand to extract the key points of the hand (i.e., the coordinate of the hand skeleton point), and the gesture recognition result is determined by the relative position relationship between the skeleton points.

After the gesture recognition result is obtained, the occlusion relationship between the hand and the virtual object can be obtained, and the motion of the virtual object can be driven according to the gesture to achieve the "physical contact" between the hand and the virtual object and realize the effect of real interaction.

In the method provided by the embodiments of the present disclosure, through the RGB image, depth image, and corresponding IMU data, the gesture information, hand contour information, and hand depth information are extracted for perform gesture recognition, so as to perform three-dimensional dense modeling of the hand under the coordinate system to obtain the three-dimensional point cloud information of the hand, render hand and the virtual object the according to the three-dimensional point cloud information of the hand and the pose information of the virtual object and the preset point cloud information of the virtual object, accurately obtain the occlusion relationship between the hand and the virtual object, and drive the motion of the virtual object according to the gesture recognition result. Therefore, the display effect of the occlusion of real still scenes and virtual scenes is optimized, and the occlusion relationship between the hand area and the virtual object in sports scenes are accurately rendered and displayed, thereby enabling more accurate "physical contact" and interaction with virtual objects through gestures, effectively enhancing the realistic experience of AR scenes.

It should be noted that the above drawings are only schematic illustrations of the processing included in the method according to the embodiments of the present disclosure, and are not intended for limitation. It is easy to understand that the processing shown in the above drawings does not indicate or limit the time sequence of the processing. In addition, it is easy to understand that these processes can be executed synchronously or asynchronously in multiple modules, for example.

Figure 6:
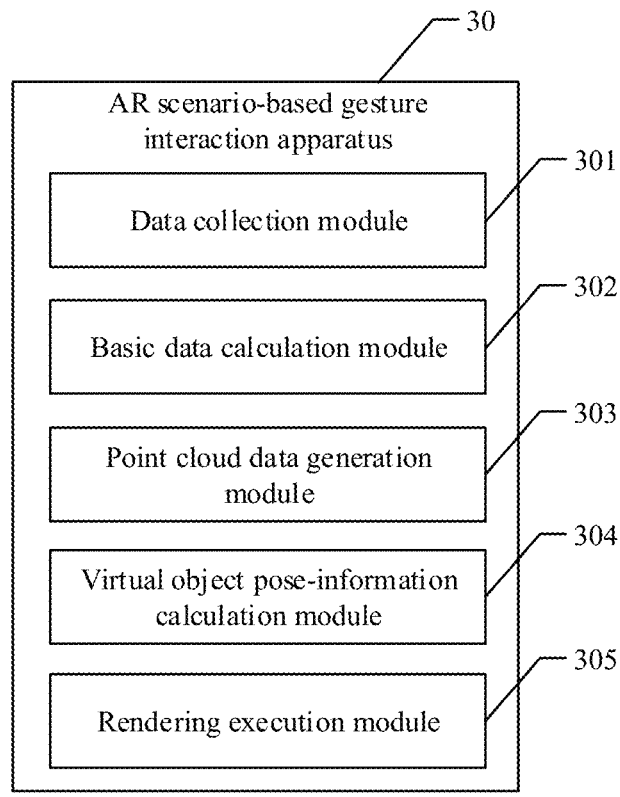
FIG. 6 is a schematic view of a composition of a wireless network access apparatus according to an embodiment of the present disclosure.

Further, referring to FIG. 6, the present disclosure also provides an AR scenario-based gesture interaction apparatus 30, including: a data collection module 301, a basic data calculation module 302, a point cloud data generation module 303, and a virtual object pose-information calculation module 304 and a rendering execution module 305.

The data collection module 301 may be configured to collect a RGB image, a depth image and corresponding IMU data of a current frame.

The basic data calculation module 302 may be configured to obtain posture information and hand information of the current frame based on the RGB image, the depth image, and the IMU data.

The point cloud data generation module 303 may be configured to perform three-dimensional dense modeling of a hand area based on the posture information and the hand information to obtain three-dimensional point cloud data of the hand area.

The virtual object pose-information calculation module 304 may be configured to obtain the pose information of a virtual object in the current frame.

The rendering execution module 305 may be configured to render the current frame based on the pose information of the current frame, the pose information of the virtual object, and the three-dimensional point cloud information of the hand area.

In some embodiments, the basic data calculation module 302 includes a pose calculation module and a hand information extraction module (not shown).

The pose calculation module may be configured to input a preset SLAM model based on the RGB image and IMU data as input parameters to obtain the pose information of the current frame.

The hand information extraction module may be configured to recognize the RGB image and the depth image to obtain the hand information; wherein the hand information includes: hand contour information and hand depth information.

In some embodiments, the pose calculation module may include: a feature point extraction module, a feature point matching module, and a posture information calculation module (not shown).

The feature point extraction module may be configured to perform feature point extraction on the RGB image and calculate a descriptor corresponding to the feature point.

The feature point matching module may be configured to perform feature point matching and IMU pre-integration calculation on the current frame image based on the feature point and the corresponding descriptor.

The posture information calculation module may be configured to perform visual inertial odometry processing on the RGB image and the IMU data to obtain a processing result, and combine the processing result with a feature point matching result of the current frame and the IMU pre-integration to calculate the posture information.

In some embodiments, the pose calculation module further includes: a pose optimization module (not shown).

The pose optimization module may be configured to perform local nonlinear optimization on the pose information based on the feature point.

In some embodiments, the hand information extraction module may include: a coordinate system registration module, a post-processing module, and a contour extraction module (not shown).

The coordinate system registration module may be configured to register the depth image to an RGB image coordinate system.

The post-processing module may be configured to perform post-processing on the depth image based on the RGB image.

The contour extraction module may be configured to extract hand contour information and hand depth information on the post-processed depth image in the RGB image coordinate system.

In some embodiments, the contour extraction module may include: an IR image processing module (not shown).

The IR image processing module may be configured to obtain an IR image corresponding to the depth image, and perform binarization processing on the IR image to extract the hand contour information.

In some embodiments, the hand information extraction module may further include: a preprocessing module (not shown).

The preprocessing module may be configured to preprocess the depth image; wherein, the preprocessing includes any one of median filtering, bilateral filtering, and hole filling.

In some embodiments, the point cloud data generating module may include: a 3D coordinate calculation module and a coordinate system conversion module (not shown).

The 3D coordinate calculation module may be configured to obtain a 3D coordinate of a corresponding pixel in a hand contour is obtained by combining a RGB image coordinate of the corresponding pixel with a depth value of the corresponding pixel.

The coordinate system conversion module may be configured to obtain the three-dimensional point cloud information of the hand in the reference coordinate system by converting the 3D coordinates to the reference coordinate system based on the posture information.

In some embodiments, the rendering execution module may include: a grid processing module and a grid rendering module (not shown).

The grid processing module may be configured to perform grid processing on the three-dimensional point cloud of the hand and the preset point cloud of the virtual object to obtain a hand grid and a virtual object grid.

The grid rendering module may be configured to render the hand grid and the virtual object grid in the reference coordinate system based on the pose information of the virtual object.

In some embodiments, the virtual object pose information calculation module 304 may include: a hit test module (not shown).

The hit test module may be configured to trigger a hit test on the virtual object in response to a control instruction to obtain the pose information of the virtual object in the reference coordinate system.

In some embodiments, the apparatus may further include a gesture recognition module and a virtual object driving module (not shown).

The gesture recognition module may be configured to recognize the depth image to obtain a gesture recognition result of the current frame.

The virtual object driving module may be configured to drive the virtual object based on the gesture recognition result.

The specific details of each module in the AR scenario-based gesture interaction apparatus have been described in detail in the corresponding AR scenario-based gesture interaction method, and therefore will not be repeated here.

It should be noted that although several modules or units of the apparatus for action execution are mentioned in the above detailed description, this division is not mandatory. In fact, according to the embodiments of the present disclosure, the features and functions of two or more modules or units described above may be embodied in one module or unit. Conversely, the features and functions of a module or unit described above can be further divided into multiple modules or units to be embodied.

Figure 7:
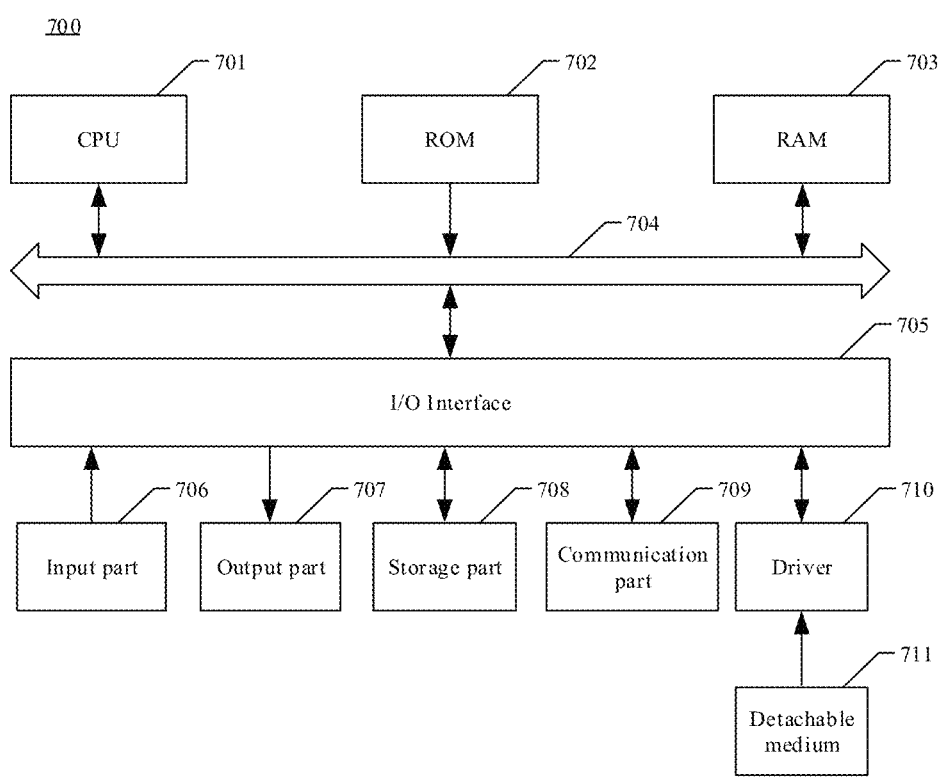
FIG. 7 is a structural schematic view of a computer system of a wireless communication device according to an embodiment of the present disclosure.

FIG. 7 is a structural schematic view of a computer system of a wireless communication device according to an embodiment of the present disclosure.

It should be noted that the computer system 700 of an electronic device shown in FIG. 4 is only an example, and should not bring any limitation to the function and application scope of the embodiments of the present disclosure.

As shown in FIG. 7, the computer system 700 includes a central processing unit (CPU) 701, which can be loaded into a random storage unit according to a program stored in a read-only memory (ROM) 702 or from a storage part 708. The program in a random access memory (RAM) 703 is accessed to execute various appropriate actions and processing. In the RAM 703, various programs and data required for system operation are also stored. The CPU 701, ROM 702, and RAM 703 are connected to each other through a bus 704. An input/output (I/O) interface 705 is also connected to the bus 704.

The following components are connected to the I/O interface 705: an input part 706 including a keyboard, a mouse, etc.; and an output part 707 such as a cathode ray tube (CRT), a liquid crystal display (LCD), and speakers, etc.; a storage part 708 including a hard disk, etc.; and a communication part 709 including a network interface card such as a local area network (LAN) card and a modem. The communication part 709 performs communication processing via a network such as the Internet. The drive 710 is also connected to the I/O interface 705 as needed. A detachable medium 711, such as a magnetic disk, an optical disk, a magneto-optical disk, a semiconductor memory, etc., is installed on the drive 710 as needed, such that the computer program read therefrom is installed into the storage part 708 as needed.

In particular, in some embodiments of the present disclosure, the process described above with reference to the flowchart can be implemented as a computer software program. For example, some embodiments includes a computer program product, which includes a computer program carried on a computer-readable medium, and the computer program contains program code for executing the method shown in the flowchart. In the embodiments, the computer program may be downloaded and installed from the network through the communication part 709, and/or installed from the detachable medium 711. When the computer program is executed by the CPU 701, various functions defined in the system of the present disclosure are executed.

It should be noted that the computer-readable medium shown in the embodiments of the present disclosure may be a computer-readable signal medium or a computer-readable storage medium, or any combination of the two. The computer-readable storage medium may be, for example, but not limited to, an electrical, magnetic, optical, electromagnetic, infrared, or semiconductor system, apparatus, or device, or any combination of the above. More specific examples of computer-readable storage media may include, but are not limited to: electrical connections with one or more wires, portable computer disks, hard disks, random access memory (RAM), read-only memory (ROM), erasable programmable read only memory (EPROM), flash memory, optical fiber, portable compact disk read-only memory (CD-ROM), optical storage device, magnetic storage device, or any suitable combination of the above. In the present disclosure, the computer-readable storage medium may be any tangible medium that contains or stores a program, and the program may be used by or in combination with an instruction execution system, apparatus, or device. In the present disclosure, a computer-readable signal medium may include a data signal propagated in a baseband or as a part of a carrier wave, and a computer-readable program code is carried therein. This propagated data signal can take many forms, including but not limited to electromagnetic signals, optical signals, or any suitable combination of the foregoing. The computer-readable signal medium may also be any computer-readable medium other than the computer-readable storage medium. The computer-readable medium may send, propagate, or transmit the program for use by or in combination with the instruction execution system, apparatus, or device. The program code contained on the computer-readable medium can be transmitted by any suitable medium, including but not limited to: wireless, wired, etc., or any suitable combination of the above.

The flowcharts and block diagrams in the accompanying drawings illustrate the possible implementation architecture, functions, and operations of the system, method, and computer program product according to various embodiments of the present disclosure. In this regard, each block in the flowchart or block diagram can represent a module, program segment, or part of code, and the above module, program segment, or part of code contains one or more executable instructions for realizing the specified logical function. It should also be noted that, in some alternative implementations, the functions marked in the block may also occur in a different order from the order marked in the drawings. For example, two blocks shown one after another can actually be executed substantially in parallel, or they can sometimes be executed in the reverse order, depending on the functions involved. It should also be noted that each block in the block diagram or flowchart, and the combination of blocks in the block diagram or flowchart, can be implemented by a dedicated hardware-based system that performs the specified function or operation, or can be realized by a combination of dedicated hardware and computer instructions.

The units involved in the embodiments described in the present disclosure may be implemented in software or hardware, and the described units may also be provided in a processor. The names of these units do not constitute a limitation on the units themselves under certain circumstances.

As another aspect, the present disclosure also provides a computer-readable medium. The computer-readable medium may be included in the electronic device described in the above embodiments; or it may exist alone without being assembled into the electronic device. The computer-readable medium carries one or more programs, and when the one or more programs are executed by an electronic device, the electronic device realizes the method described in the above embodiments. For example, the electronic device can implement the operations shown in FIG. 1.

In addition, the above drawings are merely schematic illustrations of the processing included in the method according to the exemplary embodiments of the present disclosure, and are not intended for limitation. It is easy to understand that the processing shown in the above drawings does not indicate or limit the time sequence of the processing. In addition, it is easy to understand that these processes can be executed synchronously or asynchronously in multiple modules, for example.

Those skilled in the art will easily think of other embodiments of the present disclosure after considering the specification and practicing the present disclosure disclosed herein. The present disclosure is intended to cover any variations, uses, or adaptive changes of the present disclosure. These variations, uses, or adaptive changes follow the general principles of the present disclosure and include common knowledge or conventional technical means in the technical field not disclosed in the present disclosure. The description and the embodiments are only regarded as exemplary, and the true scope and spirit of the present disclosure are pointed out by the claims.

It should be understood that the present disclosure is not limited to the precise structure that has been described above and shown in the drawings, and various modifications and changes can be made without departing from its scope. The scope of the present disclosure is only limited by the appended claims.

What is claimed is:

1. An augmented reality scenario-based gesture interaction method performed by a terminal device; wherein the terminal device comprises a camera module and an inertial measurement unit (IMU), the camera module comprising a first camera and a second camera; the method comprises:

collecting, by the first camera, a red-green-blue (RGB) image of a current frame; collecting, by the second camera, a depth image of the current frame; and collecting, by the IMU, corresponding IMU data;

obtaining posture information of the camera module and hand information in the current frame by processing the RGB image, the depth image, and the IMU data;

obtaining three-dimensional point cloud information of a hand in a reference coordinate system by performing three-dimensional dense modeling based on the posture information and the hand information of the current frame;

obtaining pose information of a virtual object in the reference coordinate system;

obtaining an occlusion relationship between the hand and the virtual object by rendering the hand and the virtual object based on the three-dimensional point cloud information of the hand, the pose information of the virtual object, and preset point cloud information of the virtual object in the reference coordinate system;

obtaining a gesture recognition result of the current frame by recognizing the depth image; and driving the virtual object based on the gesture recognition result.

2. The method according to claim 1, wherein the obtaining the posture information and the hand information of the current frame by processing the RGB image, the depth image, and the IMU data comprises:

obtaining the posture information of the current frame by inputting a preset simultaneous localization and mapping (SLAM) model based on the RGB image and IMU data as input parameters; and obtaining the hand information by recognizing the RGB image and the depth image; wherein the hand information comprises: hand contour information and hand depth information.

3. The method according to claim 2, wherein the obtaining the posture information and the hand information of the current frame by processing the RGB image, the depth image, and the IMU data comprises:

extracting a feature point from the RGB image, and calculating and obtaining a descriptor corresponding to the feature point;

performing feature point matching and IMU pre-integration calculation on the current frame based on the feature point and the corresponding descriptor; and performing visual inertial odometry processing on the RGB image and the IMU data to obtain a processing result, and calculating and obtaining the posture information by combining the processing result with a feature point matching result and an IMU pre-integration result of the current frame.

4. The method according to claim 3, further comprising:
performing local nonlinear optimization on the posture information based on the feature point.

5. The method according to claim 4, further comprising:
constructing a cost function by combining the pose information of the current frame and map point information corresponding to the feature point through a g2o optimization library or a ceres optimization library, and optimizing the posture information of the current frame through the cost function.

6. The method according to claim 4, further comprising:
selecting a key frame;
performing map reconstruction for optimizing the posture information of the key frame in the form of a partial window by combining the posture information of each frame; and
performing closed-loop detection on all the key frames to optimize accumulate errors.

7. The method according to claim 2, wherein the obtaining the hand information by recognizing the RGB image and the depth image comprises:
registering the depth image to an RGB image coordinate system;

post-processing the depth image based on the RGB image; and
extracting the hand contour information and the hand depth information from the post-processed depth image in the RGB image coordinate system.

8. The method according to claim 7, wherein the extracting the hand contour information from the post-processed depth image comprises:
obtaining an infrared image corresponding to the depth image, and performing binarization processing on the infrared image to extract the hand contour information.

9. The method according to claim 7, before the registering the depth image to an RGB image coordinate system, further comprising:
pre-processing the depth image; wherein the pre-processing comprises one of: median filtering, bilateral filtering, and hole filling.

10. The method according to claim 7, wherein the post-processing the depth image based on the RGB image comprises: performing binarization processing based on an infrared image corresponding to the depth image; and
in the extracting the hand contour information and the hand depth information from the post-processed depth image in the RGB image coordinate system, the hand contour information is binarized hand contour information.

11. The method according to claim 7, wherein the registering the depth image to an RGB image coordinate system comprises:
performing distortion removal processing on the depth image based on internal parameters of the depth image;
traversing coordinate points of the depth image in a loop, and obtaining a three-dimensional coordinate of a corresponding coordinate point in the depth camera coordinate system by combining a depth value of the corresponding coordinate point; and
based on external parameters of the depth image, external parameters of the RGB image, and internal parameters of the RGB image, obtaining a coordinate of the corresponding coordinate point in the RGB image coordinate system by projecting the three-dimensional coordinate to the RGB image coordinate system.

12. The method according to claim 1, wherein the obtaining three-dimensional point cloud information of the hand in the reference coordinate system by performing the three-dimensional dense modeling based on the posture information and the hand information of the current frame comprises:
obtaining a three-dimensional coordinate of a corresponding pixel in a hand contour by combining a RGB image coordinate of the corresponding pixel with a depth value of the corresponding pixel; and
obtaining the three-dimensional point cloud information of the hand in the reference coordinate system by converting the three-dimensional coordinates of pixels in the hand contour to the reference coordinate system based on the posture information.

13. The method according to claim 1, wherein the rendering the hand and the virtual object based on the three-dimensional point cloud information of the hand, the pose information of the virtual object, and the preset point cloud information of the virtual object in the reference coordinate system comprises:
obtaining a hand grid and a virtual object grid by gridding the three-dimensional point cloud information of the hand and the preset point cloud information of the virtual object; and rendering the hand grid and the virtual object grid based on the pose information of the virtual object in the reference coordinate system.

14. The method according to claim 1, wherein the obtaining the pose information of the virtual object in the reference coordinate system comprises:
obtaining the pose information of the virtual object in the reference coordinate system by triggering a hit test on the virtual object in response to a control instruction.

15. A non-transitory computer-readable storage medium of a terminal device, storing a computer program; wherein the terminal device comprises a camera module and an inertial measurement unit (IMU), the camera module comprising a first camera and a second camera; wherein the computer program is executed by a processor to perform:
collecting, by the first camera, a red-green-blue (RGB) image of a current frame; collecting, by the second camera, a depth image of the current frame; and collecting, by the IMU, corresponding IMU data;
obtaining posture information of the camera module and hand information in the current frame by processing the RGB image, the depth image, and the IMU data;
obtaining three-dimensional point cloud information of a hand in a reference coordinate system by performing three-dimensional dense modeling based on the posture information and the hand information of the current frame;
obtaining pose information of a virtual object in the reference coordinate system;
obtaining an occlusion relationship between the hand and the virtual object by rendering the hand and the virtual object based on the three-dimensional point cloud information of the hand, the pose information of the virtual object, and preset point cloud information of the virtual object in the reference coordinate system;
obtaining a gesture recognition result of the current frame by recognizing the depth image; and
driving the virtual object based on the gesture recognition result.

16. The computer-readable storage medium according to claim 15, wherein the computer program is executed by the processor to further perform:
obtaining the posture information of the current frame by inputting a preset simultaneous localization and mapping (SLAM) model based on the RGB image and IMU data as input parameters; and
obtaining the hand information by recognizing the RGB image and the depth image; wherein the hand information comprises: hand contour information and hand depth information.

17. The computer-readable storage medium according to claim 15, wherein the computer program is executed by the processor to further perform:
obtaining a three-dimensional coordinate of a corresponding pixel in a hand contour by combining a RGB image coordinate of the corresponding pixel with a depth value of the corresponding pixel; and
obtaining the three-dimensional point cloud information of the hand in the reference coordinate system by converting the three-dimensional coordinates of pixels in the hand contour to the reference coordinate system based on the posture information.

18. A wireless communication terminal, comprising:
a camera module and an inertial measurement unit (IMU), the camera module comprising a first camera and a second camera;
one or more processors; and
a storage device, configured to store one or more programs, when the one or more programs are executed by the one or more processors, the one or more processors perform:
collecting, by the first camera, a red-green-blue (RGB) image of a current frame; collecting, by the second camera, a depth image of the current frame; and collecting, by the IMU, corresponding IMU data;
obtaining posture information of the camera module and hand information in the current frame by processing the RGB image, the depth image, and the IMU data;
obtaining three-dimensional point cloud information of a hand in a reference coordinate system by performing three-dimensional dense modeling based on the posture information and the hand information of the current frame;
obtaining pose information of a virtual object in the reference coordinate system; and
obtaining an occlusion relationship between the hand and the virtual object by rendering the hand and the virtual object based on the three-dimensional point cloud information of the hand, the pose information of the virtual object, and preset point cloud information of the virtual object in the reference coordinate system;
wherein the hand information comprises: hand contour information and hand depth information; the obtaining the posture information and the hand information of the current frame by processing the RGB image, the depth image, and the IMU data comprises:
obtaining the posture information of the current frame by inputting a preset simultaneous localization and mapping (SLAM) model based on the RGB image and IMU data as input parameters; and
obtaining the hand information by recognizing the RGB image and the depth image, comprising:
registering the depth image to an RGB image coordinate system;
post-processing the depth image based on the RGB image; and
extracting the hand contour information and the hand depth information from the post-processed depth image in the RGB image coordinate system.

19. The wireless communication terminal according to claim 18, wherein when the one or more programs are executed by the one or more processors, the one or more processors further perform:
obtaining a gesture recognition result of the current frame by recognizing the depth image; and
driving the virtual object based on the gesture recognition result.

* * * * *